US008548539B2

(12) United States Patent
Kim et al.

(10) Patent No.: US 8,548,539 B2
(45) Date of Patent: Oct. 1, 2013

(54) CASING FOR A PORTABLE TERMINAL

(75) Inventors: Ki-Hoon Kim, Seoul (KR); Han-Seok Chae, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/539,104

(22) Filed: Jun. 29, 2012

(65) Prior Publication Data

US 2012/0268906 A1 Oct. 25, 2012

Related U.S. Application Data

(63) Continuation of application No. 12/699,454, filed on Feb. 3, 2010, now Pat. No. 8,244,321.

(30) Foreign Application Priority Data

Jul. 21, 2009 (KR) ........................ 10-2009-0066530

(51) Int. Cl.
*H04M 1/00* (2006.01)

(52) U.S. Cl.
USPC ..................... 455/575.7; 455/566; 455/575.1; 340/572.1; 361/720

(58) Field of Classification Search
USPC ............. 455/575.1, 562.1, 566, 575.3, 575.7, 455/575.5, 90.3; 361/720; 340/572.1
See application file for complete search history.

(56) References Cited

U.S. PATENT DOCUMENTS

2004/0097270 A1* 5/2004 Cha et al.
2007/0021159 A1* 1/2007 Kaneoya
2008/0068810 A1* 3/2008 Watanabe
2009/0124294 A1* 5/2009 Kim et al.
2009/0312054 A1* 12/2009 Choi
2009/0312066 A1* 12/2009 Lee et al.
2010/0331050 A1* 12/2010 Tahk et al.

FOREIGN PATENT DOCUMENTS

CN 1169095 12/1997
CN 1879253 12/2006
CN 101114732 1/2008

OTHER PUBLICATIONS

The State Intellectual Property Office of the People's Republic of China Application Serial No. 201010233533.6, Office Action dated Jan. 5, 2013, 11 pages.
European Patent Office Application Serial No. 10001320.0, Office Action dated Jan. 16, 2013, 5 pages.
Mark Peters, "Nokia 5800 XpressMusic", Let's Go Digital, Oct. 2008, 1 page.
Nokia Corporation, "Nokia Internal Photographs", D7, as published by Nokia on Jul. 2008, 7 pages.
Nokia Corporation, "Nokia Internal Photographs", D8, date unknown, 1 page.
Nokia Corporation, "Nokia Internal Photographs", D9, date unknown, 1 page.
European Patent Office Application Serial Number 10001320.0, Office Action dated Jan. 16, 2013, 5 pages.

* cited by examiner

*Primary Examiner* — April G Gonzales
(74) *Attorney, Agent, or Firm* — Lee, Hong, Degerman, Kang & Waimey

(57) ABSTRACT

Provided is a mobile communication terminal that includes a case with internal and external surfaces, antenna patterns that transmit or receive radio signals corresponding to frequency bands, a circuit board that processes signals that conform to the transmitted or received radio signals, a connection unit that electrically connects the antenna patterns to the circuit board, an accommodation chamber that accommodates a battery, and a cover detachably mounted on the case and covering the accommodation chamber and the antenna patterns.

17 Claims, 11 Drawing Sheets

CASING FOR A PORTABLE TERMINAL

CROSS-REFERENCE TO RELATED APPLICATIONS

This application is a continuation of U.S. patent application Ser. No. 12/699,454, which was filed on Feb. 3, 2010, and issued as U.S. Pat. No. 8,244,321 on Aug. 14, 2012, and which, pursuant to 35 U.S.C. §119(a), claims the benefit of earlier filing date and right of priority to Korean Patent Application No. 10-2009-0066530, which was filed on Jul. 21, 2009, the contents of which are all incorporated by reference herein in their entirety.

RELATED FIELD

The present invention relates to a portable terminal having an antenna for transmitting and receiving radio signals.

BACKGROUND

Communication terminals are either portable or stationary. The portable terminals may be categorized into handheld terminals and a vehicle mount terminals. Multifunctional portable terminal can capture still or moving images, play music or video files, receive broadcast media or provide a platform for playing games. The various features embedded in a portable terminal can be implemented in the form of hardware or software.

For example, a user interface environment is provided in order for users to easily and conveniently retrieve or select the available functions on a mobile terminal. Also, many users use their portable terminals to express their own personalities, and accordingly, various designs are provided for portable terminals. The designs may include structural changes and improvements so as for a user to use his portable terminal more conveniently. An antenna can be considered as an example of the structural change and improvement.

SUMMARY

To achieve these and other advantages and in accordance with one embodiment, a portable terminal comprises a mobile communication terminal comprises a case having internal and external surfaces. The mobile communication device further comprises a first layer formed over the external surface of the case, the first layer comprising conductors for allowing plating on the outer surface of the case; a second layer formed over the first layer, the second layer comprising an antenna pattern for transmitting and receiving radio signals corresponding to one or more frequency bands; a third layer formed over the second layer to protect the case; a circuit board configured to process signals conformable to the radio signals, wherein the circuit board is disposed within an inner surface of the case; and a connection unit formed through the case and configured to electrically connect the second layer to the circuit board.

The first layer is a layer printed over the external surface of the case and is printed by use of ink, wherein the ink comprises conductors and the print defines a pattern of formation for the conductors. The first layer further comprises a binder resin, the binder resin adhering the conductors onto the external surface of the case. The second layer is plated on the first layer and comprises a metal. A protection layer is formed over the second layer to protect the second layer. The third layer has a color similar to that of the second layer. The third layer formed over the second layer to form an outer surface of the case to protect the case. The third layer formed over the second layer is hardened by radiation. The coating material of the third layer covers the second layer and the outer surface of the case in a first color.

The connection unit comprises a recess portion recessed into the external surface of the case, the second layer being formed over the recessed surface; and one or more connection pins formed of a conductive material and inserted into a hole formed through the recessed surface, wherein one end of at least one connection pin is connected to the second layer and another end is connected to the circuit board. The second layer extends from the recessed surface to an inner circumferential surface defining the hole formed through the recessed surface. The connection pin is configured to at least partially contact the second layer on the inner circumferential surface between both ends thereof. The connection pin is formed so that one end thereof terminates at the recessed surface and another end is elastically presses against a connection terminal disposed on the circuit board. The connection pin has a first end terminating at the recessed surface and a second end protruding from an inner surface of the case, wherein the circuit board is provided with a connection terminal configured to press the second end of the connection pin.

In one embodiment, a plurality of connection pins are provided to define grounding and feeding paths with the circuit board. The cover may be configured to cover the second layer and an accommodation chamber, the accommodation chamber formed at the external surface of the case so that a battery is mounted therein. The external surface of the case comprises a main surface at which the accommodation chamber is defined and side surfaces formed in a direction crossing the main surface, wherein the pattern of the second layer is formed on at least one of the main surface and the side surfaces. One or more antennas may be configured to transmit and receive radio signals corresponding to a frequency band different from the radio signals and wherein the antenna is mounted in the terminal body.

The foregoing and other objects, features, aspects and advantages of the disclosed embodiments will become more apparent from the following detailed description of the disclosed embodiments when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EXAMPLE EMBODIMENTS

Figure 1:
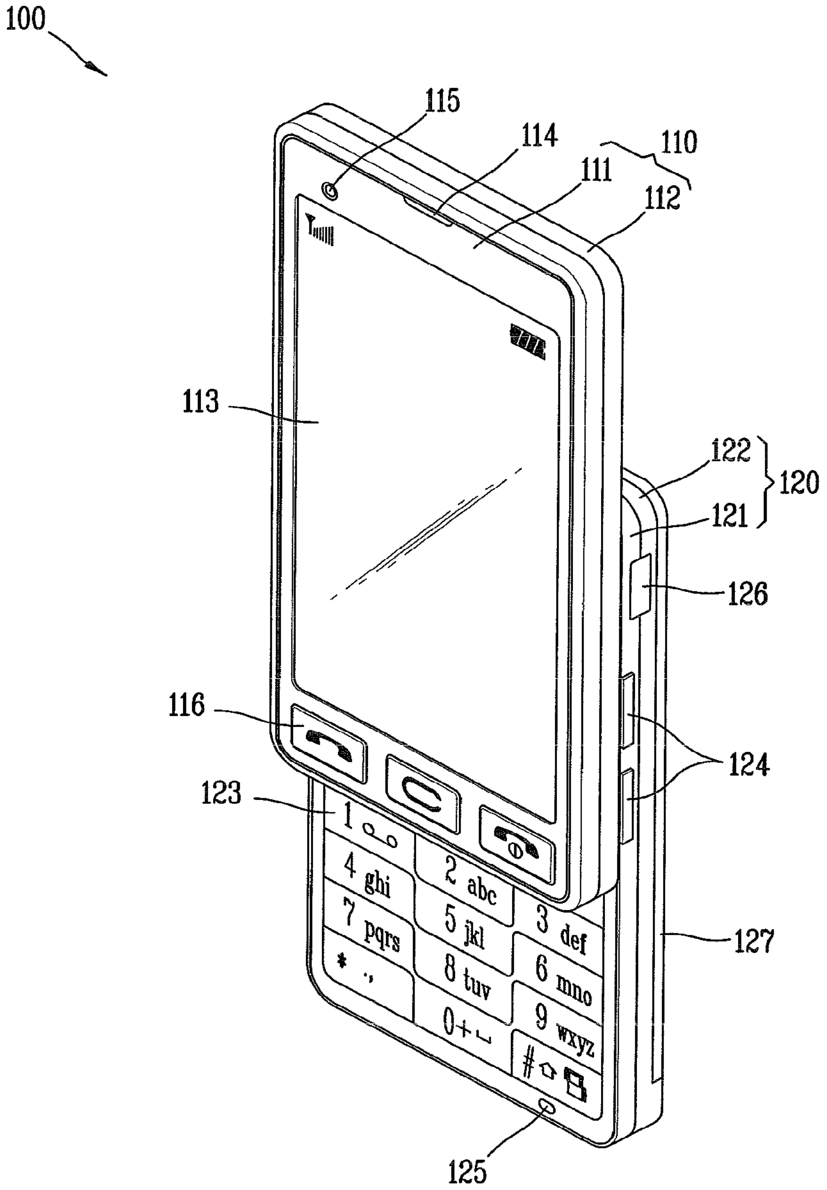
FIG. 1 is a perspective view of a portable terminal in accordance with one embodiment.

Description will now be given in detail of a portable terminal according to the disclosed embodiments, with reference to the accompanying drawings. This specification employs same or similar reference numerals for same or similar components irrespective of different embodiments. The expression in the singular form in this specification will be interchangeable with the expression in the plural form unless otherwise indicated obviously from the context.

Portable terminals described herein may include mobile phones, smart phones, laptop computers, digital broadcasting terminals, personal digital assistants (PDAs), portable multimedia players (PMPs), navigators, and the like.

FIG. 1 is a perspective view of a portable terminal in accordance with one embodiment. A main body (hereinafter, referred to as 'body') of a portable terminal 100 may include a first body 110 and a second body 120 slidable over the first body 110 in at least one direction. It is noteworthy that the disclosed embodiments may not be limited to the configuration of FIG. 1 and it may be applicable to various types of portable terminals, such as bar type, folder type, swing type, swivel type and the like.

The state where the first body 110 is positioned over the second body 120 may be referred to as a closed configuration. And, the state where the first body 110 is positioned in a way that exposes at least part of the second body 120, as shown in FIG. 1, can be referred to as an open configuration. In addition, the portable terminal may be operable in a standby (idle) mode when in the closed configuration, but this mode can be released by the user's manipulation. Also, the portable terminal may be operable in an active (phone call) mode in the open configuration. This mode may also be changed into the idle mode according to the user's manipulation or after a certain time elapses.

A case (housing, casing, cover, etc.) forming the outside of the first body 110 may comprise a front case 111 and a rear case 112. In addition, various electronic components may be disposed in a space between the front case 111 and the rear case 112. At least, one intermediate case may additionally be disposed between the front case 111 and the rear case 112. Further, the cases can be formed of resin by way of injection molding, or formed of metallic materials such as stainless steel (STS) and titanium (Ti).

A display 113, an audio output unit 114, a first video input unit 115 or a first manipulation unit 116 may be disposed on the first body 110 on the front case 111. The display 113 may be configured to display graphically rendered information. The display 113 may comprise a liquid crystal display (LCD) module, an organic light emitting diodes (OLED) module, a transparent OLED (TOLED) and the like.

The display 113 may further include a touch sensor so as to allow a user to perform a touch input. The display 113 may be configured to generate various tactile effects which a user can feel upon a touch input. Such function can be implemented by employing a haptic module cooperating with the display 113. The haptic module can generate tactile effects, such as a vibration. Such haptic module may be implemented depending on the configuration of the portable terminal 100 as well as the configuration of the display 113.

The audio output unit 114 may be configured as a receiver or a speaker. The first video input unit 115 may be a camera module for allowing a user to capture images or video. The first manipulation unit 116 may receive a command input to control the operation of the portable terminal 100. The first manipulation unit 116 may be formed as a touch screen together with the display 113.

The second body 120 may comprise a front case 121 and a rear case 122. A second manipulation unit 123 may be disposed at the second body, more particularly, at a front face of the front case 121. A third manipulation unit 124, a first audio input unit 125 and an interface 126 may be disposed on at least one of the front case 121 or the rear case 122.

The first to third manipulation unit 116, 123 and 124 can be referred to as a manipulation portion, which can be manipulated in any tactile manner that user can make a touch input. For example, the manipulation portion can be implemented as a dome switch or touchpad which can receive information or commands input by a user in a pushing or touching manner, or implemented in a manner of using a wheel, a jog or a joystick to rotate keys.

Regarding each function, the first manipulation unit 116 can be used for inputting commands such as START, END, SCROLL or the like, and the second manipulation unit 123 can be used for inputting numbers, characters, symbols, or the like. Also, the third manipulation unit 124 can function as a hot key for activating a specific function, such as activation of the first video input unit 115. The first audio input unit 125 may be configured as a microphone so as to receive user's voice, other sounds and the like.

The interface 126 may be used to connect the portable terminal 100 and external devices so as to allow data exchange therebetween or the like. For example, the interface 126 may be at least one of a wired/wireless access terminal for earphones, a short-range communication port (e.g., IrDA port, BLUETOOTH port, wireless Lan port, and the like), and power supply terminals for supplying power to the portable terminal. The interface 126 may be a card socket for accommodating an external card such as Subscriber Identification Module (SIM), User Identity Module (UIM), memory card for storing information, or the like.

Figure 2:
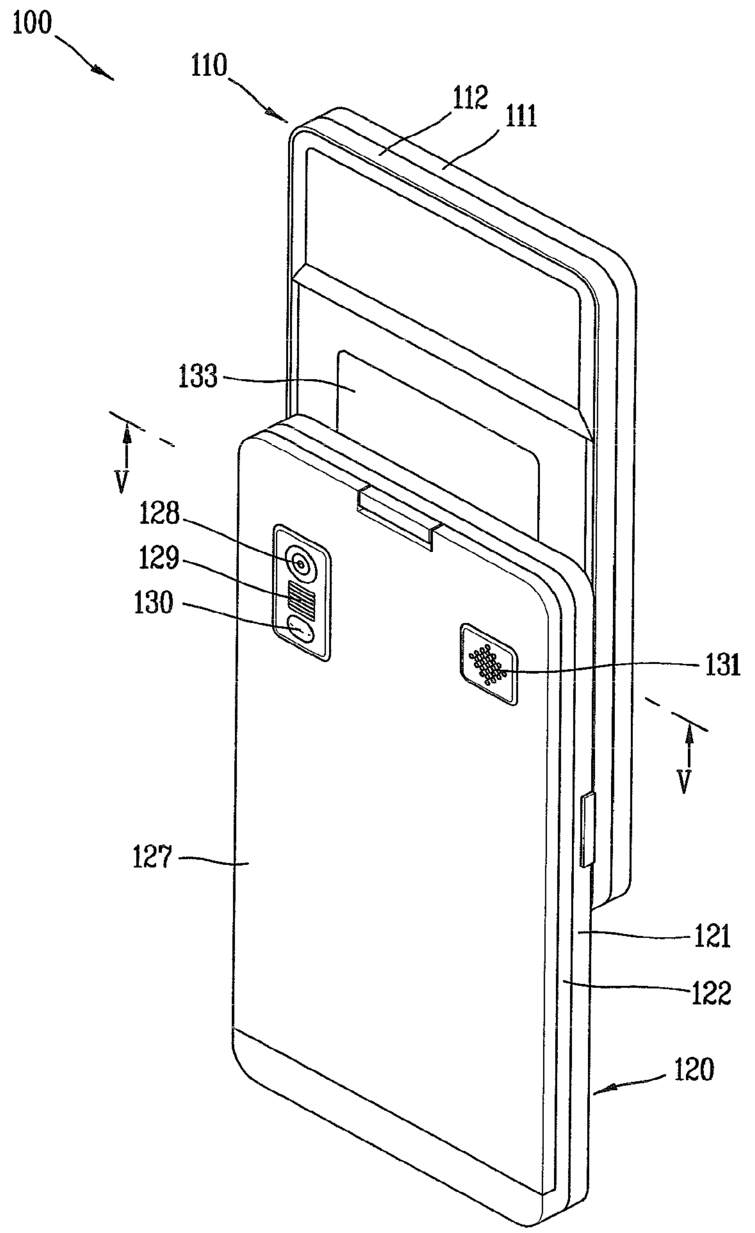
FIG. 2 is a rear perspective view of the portable terminal shown in FIG. 1 in accordance with one embodiment.

FIG. 2 is a rear perspective view of the portable terminal shown in FIG. 1. As shown in FIG. 2, a second video input unit 128 may further be disposed on the rear case 122 of the second body 120. The second video input unit 128 faces a direction which is substantially opposite to a direction faced by the first video input unit 115 (see FIG. 1). Also, the second video input unit 128 may be a camera having different pixels from those of the first video input unit 115.

For instance, the first video input unit 115 may operate with relatively lower pixels (lower resolution). Thus, the first video input unit 115 may be useful when a user can capture his face and send it to another party during a video call or the like. On the other hand, the second video input unit 128 may operate with relatively higher pixels (higher resolution) such that it can be useful for a user to obtain higher quality pictures for later use.

A flash 129 and a mirror 130 may be disposed adjacent to the second video input unit 128. The flash 129 operates in conjunction with the second video input unit 128 when taking a picture using the second video input unit 128. The mirror 130 can cooperate with the second video input unit 128 to allow a user to photograph himself in a self-portrait mode.

As described above, the second video input unit 128 is disposed at the second body 120; it is noteworthy, however, the disclosed embodiment may not be limited to the configuration. It is also possible that one or more of those components (e.g., 128 to 132), which have been described to be implemented on the rear case 122, such as the second video input unit 128, will be implemented on the first body 110, particularly, on the rear case 112. In this configuration, the component(s) disposed on the rear case 112 can be protected by the second body 120 in a closed state of the portable terminal. In addition, without the second video input unit 128, the first video input unit 115 can be implemented to be rotatable so as to rotate up to a direction which the second video input unit 128 faces.

A second audio output unit 131 may further be disposed at the rear case 122. The second audio output unit 131 can cooperate with the first audio output unit 114 (see FIG. 1) to provide stereo output. Also, the second audio output unit 131 may be configured to operate as a speakerphone. An antenna for BLUETOOTH communication, GPS communication or the like may be disposed at a terminal body. At the rear case 122 may be disposed a broadcast signal receiving antenna, as well as an antenna for call communications or the like. The antenna may retract into the terminal body 110.

A part of a slide module 133 for slidably coupling the first body 110 to the second body 120 may be disposed at the rear case 112 of the first body 110. Another part of the slide module 133 may be disposed at the front case 121 of the second body 120, so as not to be exposed to the exterior as shown in FIG. 2. A power supply 127 for supplying power to at least one component of the portable terminal 100 may be disposed at the rear case 122. The power supply 127 may be a rechargeable battery, for example, which is attachable or detachable for charging.

Figure 3:
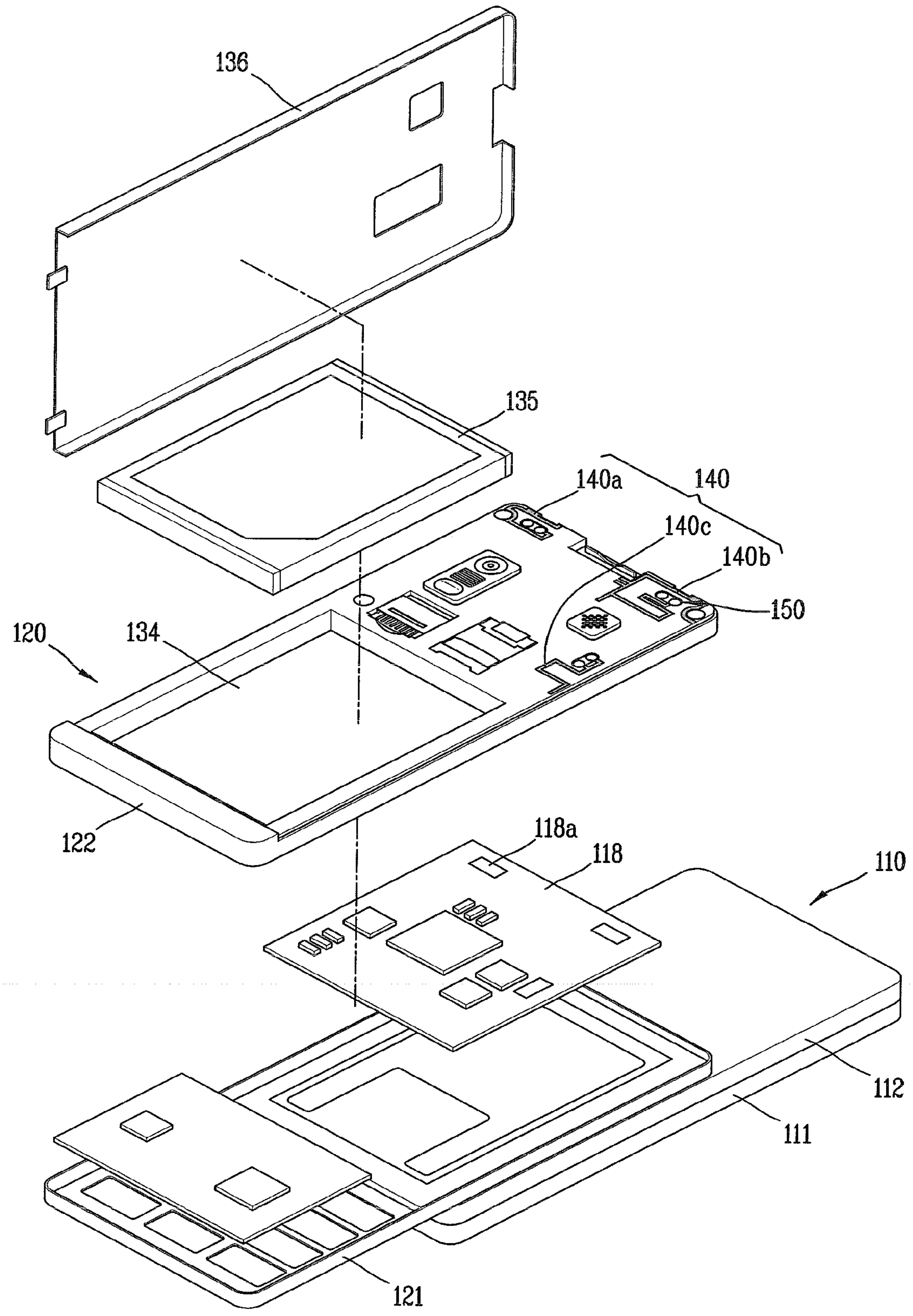
FIG. 3 is a disassembled view showing a second body of FIG. 2 viewed at a rear surface in accordance with one embodiment.
Figure 4:
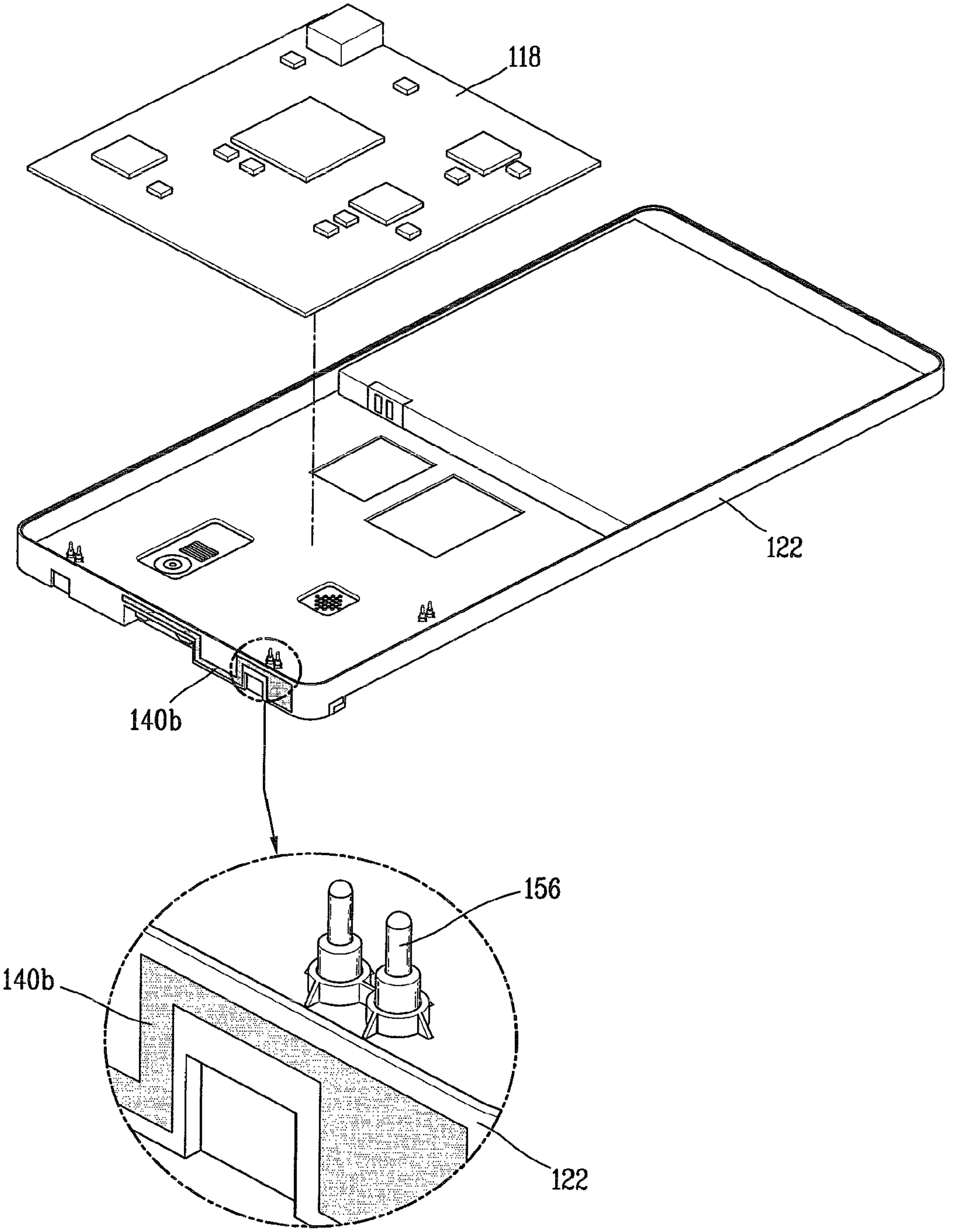
FIG. 4 is a perspective view of a rear case of FIG. 3 viewed at a front surface in accordance with one embodiment.

FIG. 3 is a disassembled view showing the second body 120 of FIG. 2 viewed at a rear face, and FIG. 4 is a perspective view of the rear case 122 of FIG. 3 viewed at a front face. Referring to FIGS. 3 and 4, an accommodation chamber 134 may be formed by recessing the rear case 122. The accommodation chamber 134 may be formed in a size conformable to an outer appearance of a battery 135 so that the battery 135 can be mounted therein. A connection terminal connected to the battery 135 may be installed at the accommodation chamber 134. The accommodation chamber 134 and the battery 135 may implement a power supply unit 127 (see FIG. 11).

As shown, a cover 136 for detachably covering the accommodation chamber 134 may be mounted at the second body 120, especially, at the rear case 122. The cover 136 may be formed in a plate shape so as to cover both the accommodation chamber 134 and the battery 135. Still referring to FIGS. 3 and 4, an antenna pattern 140 having a specific pattern may be formed, for example, at an outer surface of the rear case 122. Hereinafter, description will be given of the antenna pattern 140 being formed on the outer surface of the rear case 122, but the disclosed embodiments may not be limited to this exemplary position. Depending on implementation, the antenna pattern 140 may be formed on the cover 136, the front case 121, the front and rear cases 111 and 112 of the first body 110, or the like.

The antenna pattern 140 may comprise a transceiver for transmitting and receiving radio signals. FIG. 3 shows that the antenna pattern 140 is located at a position covered with the cover 136; however, the disclosed embodiments may not be limited to the example position. For example, the antenna pattern 140 may be located at a portion, which is not covered with the cover 136, on the outer surface of the rear case 122.

A circuit board 118 may be mounted in the front case 121 or the rear case 122 of the rear case 120. The circuit board 118 may be disposed to be covered with an inner surface of the rear case 122, more especially, an opposite surface to the outer surface of the rear case 122. The circuit board 118 may be configured as one example of a controller 180 (see FIG. 1) for controlling the terminal to execute various functions thereof. The circuit board 118 may process a signal responsive to a radio signal transmitted or received by the antenna pattern 140.

The antenna pattern 140 may be provided in multiple forms to transmit and receive radio signals corresponding to different frequency bands, for example. Referring to FIG. 3, the antenna patterns 140*a*, 140*b* and 140*c* may be located adjacent to edges of the rear case 122 so as to ensure a spaced distance therebetween. The frequency band of radio signals transmitted and received via the antenna patterns 140*a*, 140*b* and 140*c* may be a frequency band, for example, corresponding to global positioning system (GPS), BLUETOOTH, media forward link only (MediaFLO), wireless communication and the like.

Still referring to FIGS. 3 and 4, the outer surface of the rear case 122 may include a main surface and side surfaces, wherein the main surface indicates a surface at which the accommodation chamber is formed and the side surfaces indicate surfaces formed in a direction crossing the main surface. The antenna pattern 140 may be formed on at least one of the main surface and the side surfaces. The antenna pattern 140*b* corresponding to a frequency band may be formed over the main surface and the side surfaces, thereby implementing a three-dimensional antenna.

Figure 5:
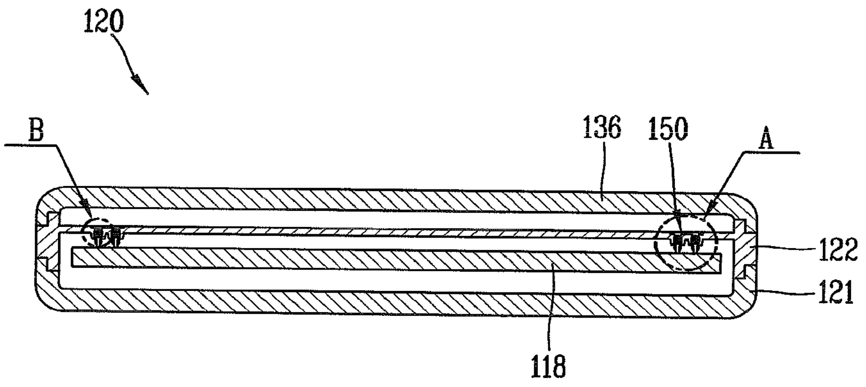
FIG. 5 is a cross-sectional view of the second body taken along the line V-V of FIG. 2 in accordance with one embodiment.
Figure 6A:
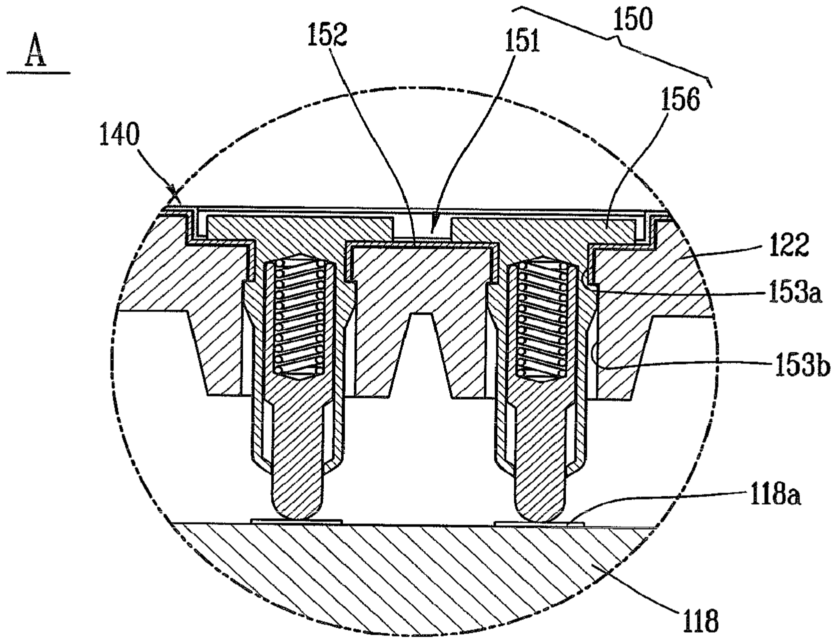
FIGS. 6A and 6B are enlarged views respectively showing cross-sections A and B of FIG. 5 in accordance with one embodiment.
Figure 6B:
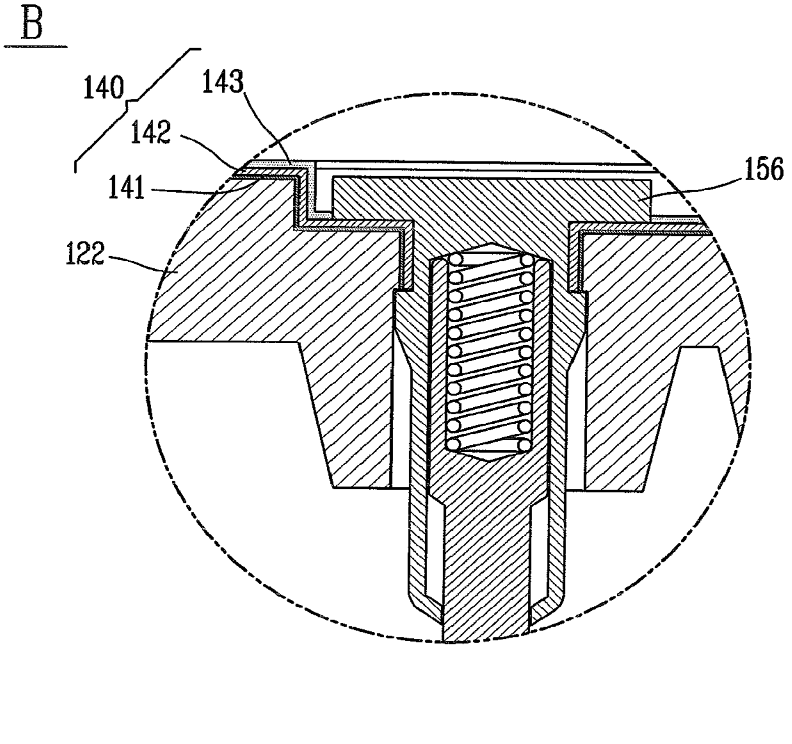

Hereinafter, description will be given in detail of the structure of the antenna pattern 140 with reference to FIGS. 5, 6A and 6B. FIG. 5 is a cross-sectional view of the second body 120 taken along the line V-V of FIG. 2, and FIGS. 6A and 6B are enlarged views respectively showing parts A and B of FIG. 5. Referring to FIGS. 5, 6A and 6B, the portable terminal may include first, second and third layers. The first layer may be a printed layer 141 printed on the outer surface of the case. The second layer may be a plating layer 142 plated on the first layer, and the third layer may be a coating layer 143 coated on the outer surface of the case to protect the case.

A printed layer 141 may be printed on the outer surface of the rear case 122. The printed layer 141 may contain conductors 141*a* (see FIG. 8A) by which plating is allowed on the outer surface of the rear case 122. The rear case 122 may be formed of a non-conductive material, such as synthetic resin, accordingly the conductors 141*a* can render the printed layer 141 plated on the non-conductive material. The printed layer 141 may be printed so as to define preset patterns on the outer surface of the rear case 122 by ink containing the conductors 141*a*. The conductor 141*a* may be copper Cu, silver Ag or the like, for example. The preset patterns may be designed by test, simulation or the like.

Referring to FIGS. 5, 6A, 6B and 8D, a plating layer 142 may be formed to be stacked on the printed layer 141. The plating layer 142 may be plated on the printed layer 141, so as to define a preset antenna pattern for transmitting and receiving radio signals corresponding to a frequency band. The plating layer 142 may be formed by electroless plating, and plated along the pattern of the printed layer 141 so as to obtain the preset pattern. The plating layer 142 may be formed of a single metal, for example, copper Cu. That is, the plating layer 142 may be a copper-plated single layer.

A coating layer 143 for protecting the rear case 122 may be formed at the outer surface of the rear case 122. The coating layer 143 may be formed by a coating material which is hardened by radiation. Such radiation may comprise ultraviolet rays, so the coating layer 143 can be a UV coating layer. The coating material may be coated all over the outer surface of the rear case 122, and also coated on the plating layer 142. The coating material may have a color, so as to be coated on the plating layer 142 and the outer surface of the rear case 122 with the same color. Accordingly, the outer surface of the rear case 122 and the antenna pattern 140 may be further integrated with each other, which makes a user difficult to easily distinguish the antenna pattern 140 from the outer surface of the rear case 122.

Also, the copper plating is vulnerable to corrosion or the like, and thus a nickel plating may be generally executed on the copper plating. However, the coating layer 143 can render the plating layer 142 defined as a copper-plated single layer and simultaneously can protect the outer surface of the rear case 122. Hence, transmission and reception performance of the antenna can be improved, and a glossy effect, for example, can be provided to the case. As shown in the drawings, the plating layer 142 and the circuit board 118 may be electrically connected to each other via a connection unit 150 which serves to connect them to each other via the rear case 122.

The connection unit 150 may include a recess portion 151 and connection pins 156. The recess portion 151 may be recessed into the outer surface of the rear case 122, and the plating layer 142 may be formed on a recessed surface 152. The plating layer 142 may extend from the preset pattern to the recessed surface 152. To this end, the printed layer 141 may be formed on the recessed surface 152.

Still referring to FIGS. 5, 6A and 6B, the recessed surface 152 may have through holes, each forming openings at the outer surface and the inner surface of the rear case 122, respectively, so as to communicate the inner space of the terminal with the outer space thereof. The plating layer 142 may extend from the recessed surface 152 to an inner circumferential surface defining the through hole, for which the printed layer 141 may be formed on the inner circumferential surface.

Referring to the drawings, each through hole may be stepped in the penetrating direction. The stepped portion may generate first and second inner circumferential surfaces 153*a* and 153*b*. The first inner circumferential surface 153*a* adjacent to the outer surface of the rear case 122 of the first and second inner circumferential surfaces 153*a* and 153*b* has a width smaller than that of the second inner circumferential surface 153*b*. The printed layer 141 may be formed down to the first inner circumferential surface 153*a*.

The connection pin 156 formed of a conductive material may be inserted into each of the through holes. The connection pin 156 may have one end connected to the plating layer 142 and another end connected to the circuit board 118. The one end of the connection pin 156 may have a width greater than that of the through hole, and be formed to be hooked at the recessed surface 152. The connection pin 156 may be formed such that at least part thereof can contact the plating layer 142 formed on the inner circumferential surface.

Referring to the drawings, the plating layer 142 formed on the first inner circumferential surface 153*a* comes in contact with an outer circumferential surface of the connection pin 156, thereby reinforcing the electrical connection between the connection pin 156 and the plating layer 142. The other end of the connection pin 156 may be configured to elastically press a connection terminal 181*a* disposed on the circuit board 118. The connection pin 156 may be, for example, a pogo pin having an end moved by an elastic member. A Pogo pin is a device used in to establish a (usually temporary) connection between two printed circuit boards. A pogo pin make takes the form of a slender cylinder containing two sharp spring-loaded pins. Pressed between two electronic circuits, the sharp points at each end of the pogo pin make secure contacts with the two circuits and thereby connect them together.

As the connection pin 156 presses the connection terminal 118*a* on the circuit board 118, an electrical connection path is formed between the circuit board 118 and the plating layer 142. The connection pin 156 may be provided in plurality so as to define grounding and feeding paths with the circuit board 118. One of the electrical connection paths may serve as the grounding path and the other one serve as the feeding path. Accordingly, the antenna pattern 140 can be in a radiator pattern and formed as a planar inverted F antenna (PIFA).

A current feed from the circuit board 118 may be carried to the plating layer 142 via the feeding path, and the current having circulated the plating layer 142 may flow back to the circuit board 118 via the grounding path, thereby defining a transmission line for transmitting and receiving radio signals in the air. However, the disclosed embodiments may not be limited to this configuration; the plating layer 142, the electrical connection paths and the circuit board 118 may form a loop antenna, a dipole antenna, a monopole antenna and the like.

As such, the formation of the plating layer 142 on the outer surface of the rear case 122 may implement a portable terminal having superior transmission and reception performance to that of an antenna formed at an inner surface of the case or mounted in the terminal. Also, the antenna integrally formed with the case may implement a slimmer antenna structure, so as to improve the flexible design for the inner space of the terminal.

Figure 7:
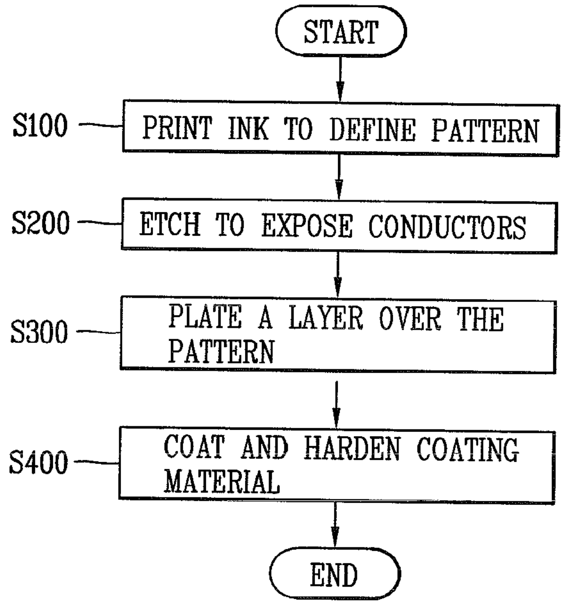
FIG. 7 is a flowchart of plating an antenna pattern on a case in accordance with one embodiment.

Hereinafter, description will be given of a process for forming the plating layer 142 with reference to FIGS. 7, 8A to 8D. FIG. 7 is a flowchart of plating an antenna pattern on a case, and FIGS. 8A to 8D are conceptual views showing the state of each step of the plating process. Referring to FIG. 7, ink is printed on a case so as to form a printed layer defining a pattern (S100). The printing may be achieved by a pad printing, spray printing and the like, for example.

Figure 8A:
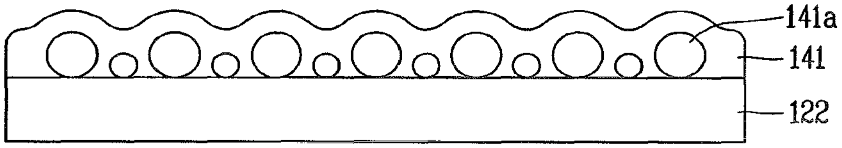
FIGS. 8A to 8D are conceptual views showing the state of each step of the plating process in accordance with one embodiment.

Referring to FIG. 8A, the ink contains conductors 141*a*, which may be 2-3 μm sized copper particles. As shown in FIG. 8A, the conductors 141*a* may be disposed to be spaced from one another in a lengthwise direction, unlike a conductive ink. Accordingly, the printed layer 141 may be conductive in the thickness direction but non-conductive in the lengthwise direction. Also, it is possible to reduce the interference of the printed layer 141 with the transmission and reception of radio signals of the plating layer 142 (see FIG. 8C). It is noteworthy that the disclosed embodiments may not be limited to the exemplary structures discussed here. Alternatively, the printed layer 141 may be formed by use of the conductive ink.

Figure 8B:
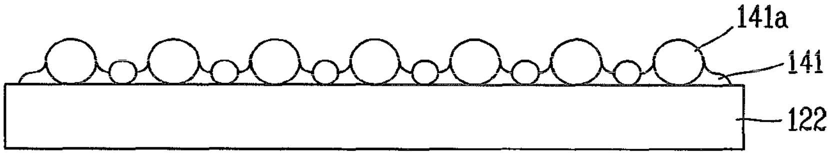

The printed layer 141 may include a binder resin which allows the conductors 141*a* to be adhered onto the outer surface of the case. Referring back to FIG. 7, the printed layer 141 may be etched so as to externally expose the conductors 141*a* (S200), and then subjected to a plating process so as to form a plated layer 142 on the pattern (S300). The etching may be an alkali etching, for example, and the process of forming the plating layer 142 may include neutralizing the printed layer 141 after performing etching. Referring to FIG. 8B, part of the conductors 141*a* are externally exposed by the etching, which can enhance the plating performance.

Figure 8C:
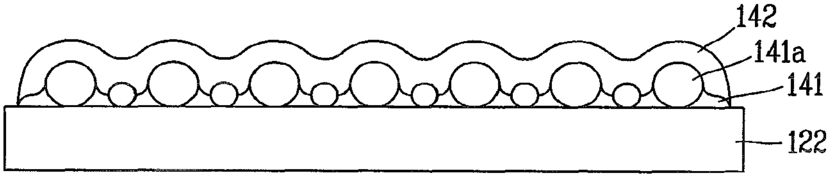
Figure 8D:
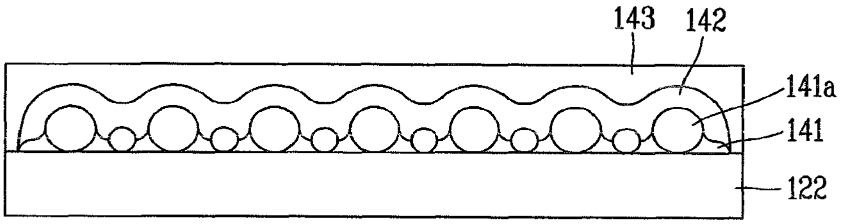

The plating may be achieved by chemical plating or an electroplating, for example, copper plating. Referring to FIG. 8C, the plating layer 142 may cover the conductors 141*a* contained in the printed layer 141 by means of the plating. Referring back to FIG. 7, a coating material is coated on the outer surface of the case and then hardened (S400). Accordingly, as shown in FIG. 8D, the case 122 and the plating layer 142 are covered with the coating layer 143 so as to be protected from the outside.

Figure 9A:
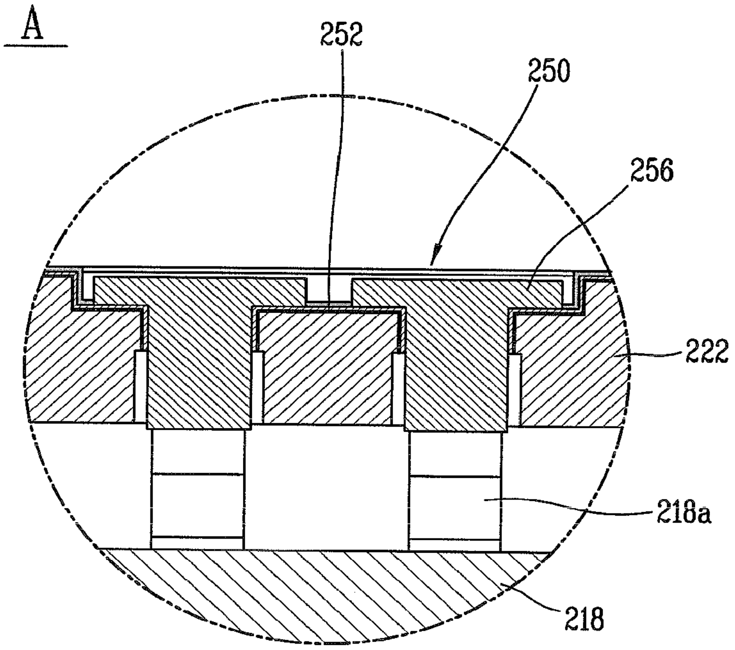
FIG. 9A is an enlarged view showing a variation of a connection unit at part A of FIG. 5 in accordance with one embodiment.
Figure 9B:
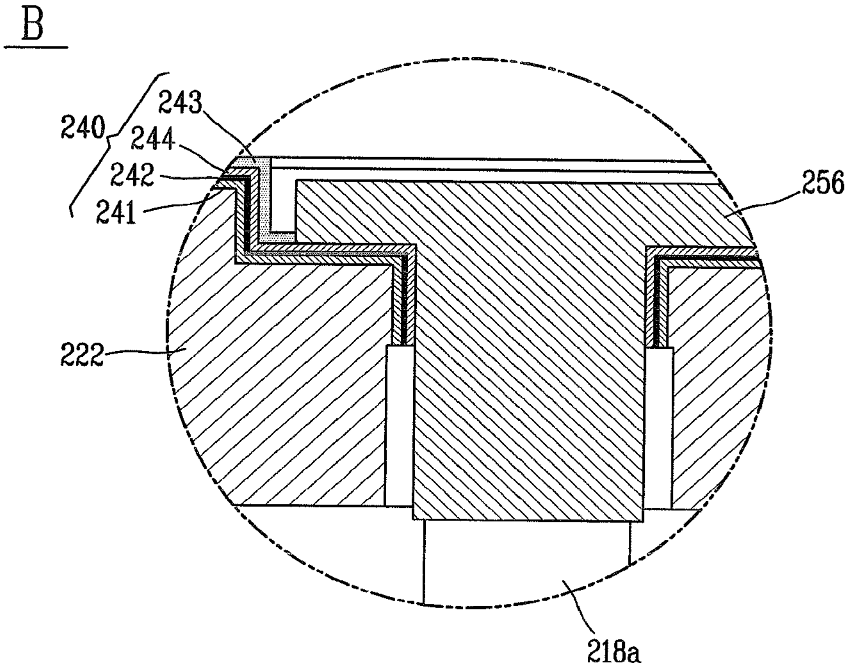
FIG. 9B is an enlarged view showing a variation of a plating layer at part B of FIG. 5 in accordance with one embodiment.

FIG. 9A is an enlarged view showing a variation of a connection unit 250 formed at part A of FIG. 5, and FIG. 9B is an enlarged view showing a variation of a plating layer 242 formed at part B of FIG. 5. Referring to FIG. 9A, the connection pin 256 may have one end stopped at a recessed surface 252, and another end protruded from an inner surface of a rear case 222. The connection pin 256 may be implemented as a single body. The connection pin 256 may be press-fitted into a through hole so that its outer circumference can be engaged by insertion with an inner circumference of the through hole. Consequently, the contact with the plating layer 242 can be enhanced. However, the disclosed embodiments may not be limited to this structure, but the connection pin 256 may have a screw thread on its outer circumferential so as to be coupled into the through hole by a screw. In this case, the screw thread of the connection pin 256 is coupled with a female screw formed at the plating layer 242, whereby the plating layer 242 and the connection pin 256 may be electrically connected to each other.

A circuit board 218 may have a connection terminal 218*a* configured to press another end of the connection pin 256. The connection terminal 218*a* may be elastically transformable, for example, formed of C clip, conductive rubber and the like. Referring to FIG. 9B, a protection plating layer 244 coated on the plating layer 242 for protecting the plating layer 242 may be formed between the plating layer 242 and a coating layer 243. The protection plating layer 244 may be formed by nickel plating, for example.

The coating layer 243 may have a color similar to that of the protection plating layer 244 rather than the plating layer 242. For example, the plating layer 242 may be a copper plated layer, the protection plating layer 244 may be a nickel plated layer and the coating layer 243 may have a silver color. If the copper plated layer is coated with the silver coating layer, due to the difference between the copper color and the silver color, the coating layer 243 should be coated thicker in order to cover the outer surface of the case 222 with the same color. Hence, the protection plating layer 244 can be provided with the color more similar to the color of the coating layer 243, thereby making the coating layer 243 thinner.

Figure 10:
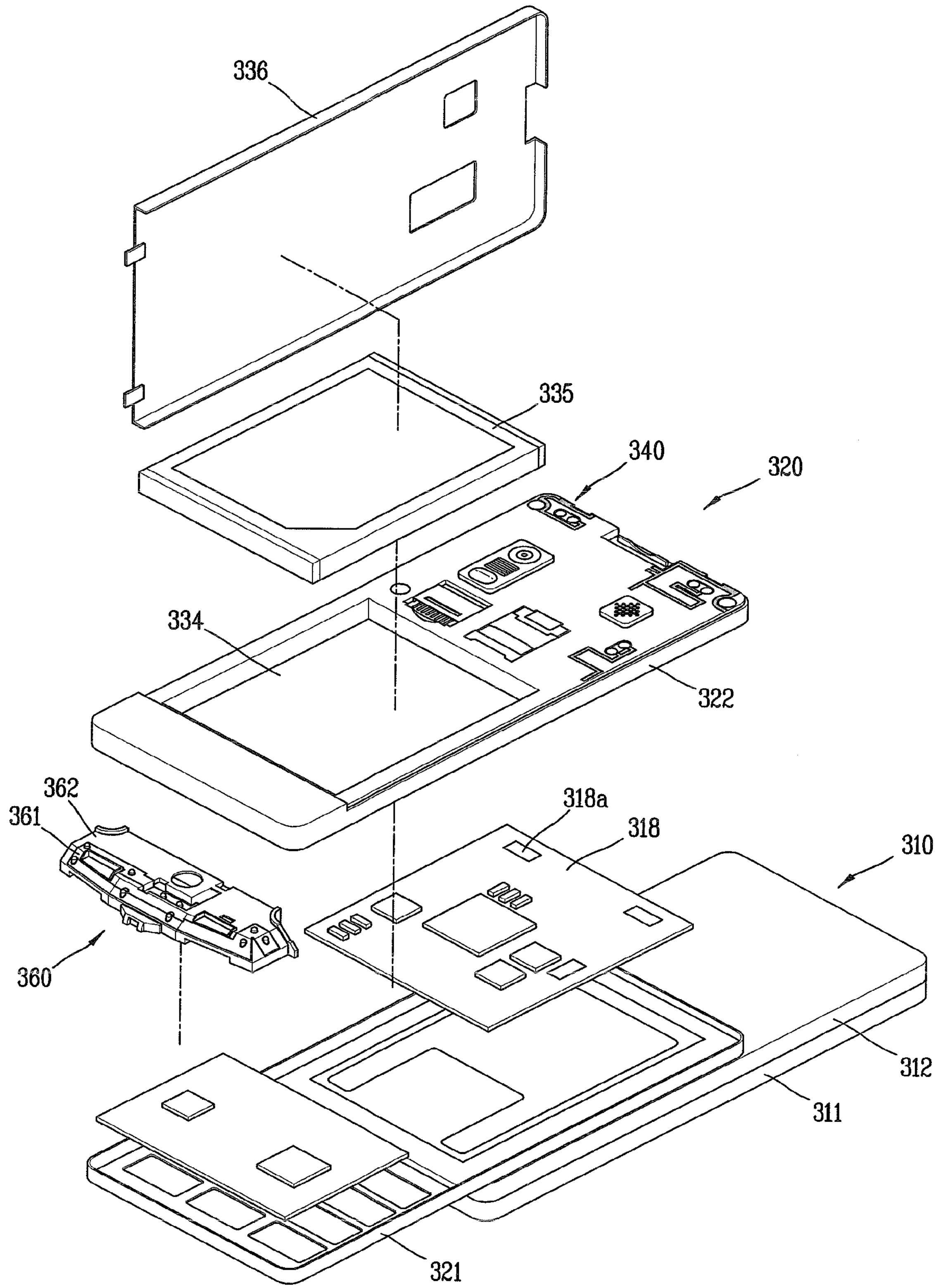
FIG. 10 is a disassembled view showing another embodiment of a portable terminal in accordance with one embodiment.

FIG. 10 is a disassembled view showing another embodiment of a portable terminal 300. The portable terminal 300 may include an antenna 360 mounted in a first or second body 310 or 320. The antenna 360 may be provided to transmit and receive radio signals of a frequency band different from radio signals transmitted and received via an antenna configured by an antenna pattern 340 plated on a rear case 322. As shown in FIG. 10, the antenna 360 may be mounted adjacent to one end of the second body 320. The antenna 360 may include radiators 361 and a carrier 362.

The radiators 361 may be formed in form of pattern by which radio signals can be transmitted and received, and formed of a conductive material, for example, a metallic thin plate made of gold, copper or the like. The carrier 362 may be formed at which the radiators 361 are mounted. The carrier 362 may include holes through which the radiators 361 are inserted. One end of each radiator 361 may be inserted through the hole to be electrically connected to a circuit board 318.

Consequently, the portable terminal 300 can transmit and receive radio signals corresponding to a multi frequency band via the antenna configured by the antenna pattern 340 and the internal antenna 360. For example, the internal antenna 360 may allow transmission and reception of radio signals corresponding to the frequency band associated with a wireless communication and also radio signals corresponding to a frequency band associated with BLUETOOTH or GPS.

Figure 11:
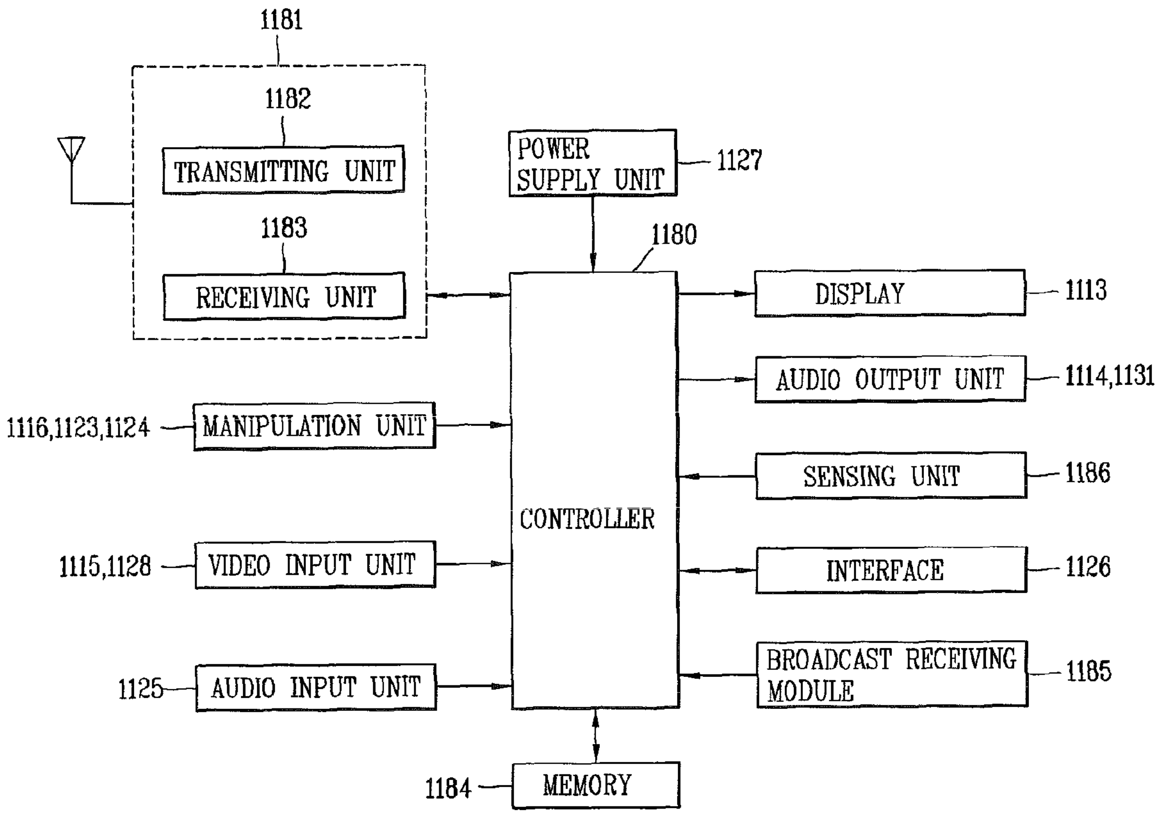
FIG. 11 is a block diagram of a portable terminal in accordance with one embodiment.

FIG. 11 is a block diagram of a portable terminal in accordance with one or more of the disclosed embodiments. As shown in FIG. 11, the portable terminal according to the one embodiment may include a wireless communication module 1181, manipulation units 1116, 1123 and 1124, video input units 1115 and 1128, an audio input unit 1125, a display 1113, audio output units 1114 and 1131, a sensing unit 186, an interface 1126, a broadcast receiving module 1185, a memory 1184, a power supply 1127 and a controller 1180.

The controller 1180 may control an overall operation of the portable terminal. For example, the controller 1180 may perform related control and processing for a voice call communication, data communication, telephony communication and the like. Also, the controller 1180 may control operations of the portable terminal according to the disclosed embodiments in addition to the typical control function. The wireless communication module 1181 may transmit and receive radio signals with a mobile communication base station via an antenna. For example, the wireless communication module 1181 manages transmission and reception of audio data, text data, video data and control data under the control of the controller 1180. To this end, the wireless communication module 181 may include a transmitting unit 182 for modulating and transmitting a signal to be sent, and a receiving unit 183 for demodulating a signal received.

The manipulation units 1116, 1123, 1124 may be configured, as shown in FIG. 11, thus to provide the controller 1180 with key input data input by a user to control the operations of the portable terminal. The manipulation units 1116, 1123, 1124 may include a dome switch, a touchpad (e.g., static pressure/capacitance), a jog wheel, a jog switch and the like. The video input units 1115 and 1128 process image frames of still images or video obtained by an image sensor in a video call mode or a capturing mode. Such processed image frames are converted into image data displayable on the display 1113 to be then output on the display 1113.

The image frames processed by the video input units 1115 and 1128 may be stored in the memory 1184 under the control of the controller 1180 or be sent to the exterior via the wireless communication module 1181. The audio input unit 1125 receives an external audio signal via a microphone while the portable terminal is in a particular mode, such as phone call mode, recording mode and voice recognition. This audio signal is processed and converted into digital data. Such processed digital data is converted into a data format transmittable to a mobile communication base station via the wireless communication module 1181 when the portable terminal is in the phone call mode, and then outputted to the wireless communication module 1181. The processed digital data may be stored in the memory 184 in a recording mode.

The audio input unit 1125 may include assorted noise removing algorithms to remove noise generated in the course of receiving the external audio signal. The display 1113 displays information processed in the portable terminal. For example, when the portable terminal is in a phone call mode, the display 1113 displays User Interface (UI) or (Graphic User Interface (GUI) related to the call under the control of the controller 1180. If the display 1113 includes a touch screen, it may be used as an input device as well as an output device.

The audio output units 1114 and 1131 may convert audio data received from the wireless communication module 1181 or audio data stored in the memory 1184 under the control of the controller 1180 when the portable terminal is in the call-receiving mode, a phone call mode, a recording mode, a voice recognition mode, or a broadcast receiving mode. Such converted audio data is then outputted to the exterior. The audio output units 1114 and 1131 also output an audio signal associated with a function (e.g., outputting a call receiving sound, a message receiving sound, or the like) performed in the portable terminal. Such audio output units 1114 and 1131 may include a speaker, a receiver, a buzzer and the like.

The sensing unit 1186 provides status measurements of various aspects of the portable terminal. For instance, the sensing unit 1166 may detect an open/close status of the portable terminal, a change of position of the portable terminal or a component of the portable terminal, a presence or absence of user contact with the portable terminal and the like, thereby generating a sensing signal for controlling the operation of the portable terminal. For example, the sensing unit 1186 senses the open or closed state of a slide type portable terminal, and outputs the sensed result to the controller 1180, such that the operation of the portable terminal can be controlled. Other examples include the sensing unit 1186 sensing the presence or absence of power provided by the power supply 1127, the presence or absence of a coupling or other connection between the interface 1126 and an external device.

The interface 1126 is often implemented to couple the portable terminal with external devices. Typical external devices include wired/wireless headphones, external chargers, wired/wireless data ports, card sockets (e.g., memory card, SIM/UIM card or the like) and the like. The interface 1126 may allow the portable terminal to receive data or power from external devices and transfer such data or power to each component inside the portable terminal, or transmit internal data of the portable terminal to external devices. The memory 1184 may store a program for the control and processing of the controller 1180, or temporarily store input/output data (e.g., phone book data, messages, still images, video or the like).

Also, the memory 1184 may store a program for controlling the operation of the portable terminal according to the disclosed embodiments. The memory 1184 may include typically known hard disk, a card-type memory (e.g., SD or XD memory), a flash memory, RAM, ROM and the like. The broadcast receiving module 1185 may receive a broadcast signal transmitted via satellites or terrestrial waves and convert such broadcast signal into a broadcast data format capable of being output to the audio output units 1114 and 1131 and the display 1113 so as to output the converted signal to the controller 1180. The broadcast receiving module 1185 may also receive additional data associated with broadcasting (e.g., Electric Program Guide (EPG), channel list, or the like). The broadcast data converted in the broadcast receiving module 1185 and the additional data may be stored in the memory 1184. The power supply 1127 (i.e., battery) provides power required by the various components for the portable terminal. The provided power may be internal power, external power, or combinations thereof.

The claimed subject matter embodies a portable terminal having superior transmission and reception performance by forming a plating layer on an outer surface of a case. Consequently, a slimmer antenna structure can be achieved, and design flexibility for the inner space of the terminal can be enhanced. The disclosed embodiments may configure a three-dimensional antenna utilizing side walls of the case or the like, owing to the antenna plated on a printed layer. Also, the outer surface of the case and the plating layer are coated with a coating material, whereby the outer surface of the case and the antenna can be more integrated with each other.

The aforesaid configuration and method for the mobile terminal is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal comprising:

a case having an internal surface and an external surface, the external surface comprising a main surface and side surfaces;

one or more antenna patterns configured to at least transmit or receive radio signals corresponding to one or more frequency bands, the one or more antenna patterns formed over the main surface and at least one of the side surfaces such that the one or more antenna patterns form a three-dimensional shape;

a circuit board covered by the case and configured to process signals compatible with the radio signals;

an accommodation chamber formed at the external surface and configured to receive a battery; and a cover detachably mounted on the case and configured to cover the accommodation chamber and each of the one or more antenna patterns, wherein a material covers each of the one or more antenna patterns and the external surface of the case, and wherein a plating layer is plated on the one or more antenna patterns and located between the one or more antenna patterns and the material such that the material contacts the plating layer rather than the one or more antenna patterns.

2. The mobile communication terminal of claim 1, further comprising a connection unit formed through the case and configured to electrically connect the one or more antenna patterns to the circuit board, wherein:

the connection unit comprises a first end portion and a second end portion;

the first end portion is connected to the one or more antenna patterns; and the second end portion is connected to the circuit board.

3. The mobile communication terminal of claim 2, further comprising a hole formed through the external surface, wherein the connection unit is located in the hole and configured to connect the one or more antenna patterns to the circuit board.

4. The mobile communication terminal of claim 3, wherein the cover is further configured to cover the hole.

5. The mobile communication terminal of claim 1, wherein:

the main surface forms the accommodation chamber; and the side surfaces are formed in a direction that crosses the main surface.

6. The mobile communication terminal of claim 1, wherein a color of the material is similar to a color of the case.

7. The mobile communication terminal of claim 1, wherein:

the one or more antenna patterns are located adjacent to edges of the case such that a space exists between the edges of the case and each of the one or more antenna patterns.

8. The mobile communication terminal of claim 7, wherein frequency bands of the radio signals correspond to at least a global positioning system (GPS), a BLUETOOTH™ system, or a media forward link only (MediaFLO) system.

9. The mobile communication terminal of claim 1, further comprising an antenna mounted on a body of the mobile communication terminal, wherein the antenna is configured to at least transmit or receive radio signals corresponding to frequency bands that are different from frequency bands corresponding to the one or more antenna patterns.

10. The mobile communication terminal of claim 9, wherein:

the antenna is located at a first side of the mobile communication terminal; and the one or more antenna patterns correspond to a location of the accommodation chamber.

11. A mobile communication terminal comprising:

a body comprising a case that has an internal surface and an external surface, the external surface comprising a main surface and side surfaces;

a circuit board mounted in the case and configured to process signals compatible with radio signals corresponding to one or more frequency bands;

one or more antenna patterns configured to at least transmit or receive the radio signals, the one or more antenna patterns that are configured to electrically connect to the circuit board and formed over the main surface and at least one of the side surfaces such that the one or more antenna patterns form a three-dimensional shape;

an accommodation chamber formed at the external surface and configured to receive a battery;

a cover detachably mounted on the case and configured to cover the accommodation chamber and each of the one or more antenna patterns;

a layer formed over each of the one or more antenna patterns and the external surface of the case; and a plating layer plated on the one or more antenna patterns and located between the one or more antenna patterns and the layer such that the layer contacts with the plating layer instead of the one or more antenna patterns.

12. The mobile communication terminal of claim 11, further comprising a connection unit formed through the case and configured to electrically connect the one or more antenna patterns to the circuit board.

13. The mobile communication terminal of claim 12, further comprising a hole formed through the external surface, wherein:

the connection unit is located in the hole; and the cover is further configured to cover the hole and the one or more antenna patterns.

14. The mobile communication terminal of claim 12, wherein:

the connection unit comprises a first end portion and a second end portion;

the first end portion is connected to the one or more antenna patterns; and the second end portion is connected to the circuit board.

15. The mobile communication terminal of claim 11, wherein:

the main surface forms the accommodation chamber; and the side surfaces are formed in a direction that crosses the main surface.

16. The mobile communication terminal of claim 15, wherein:

the one or more antenna patterns are located adjacent to edges of the case such that a space exists between the edges of the case and each of the one or more antenna patterns.

17. The mobile communication terminal of claim 15, further comprising an antenna mounted on a body of the mobile communication terminal, wherein the antenna is configured to at least transmit or receive radio signals corresponding to frequency bands that are different from frequency bands corresponding to the one or more antenna patterns.

* * * * *